(12) United States Patent
Feng et al.

(10) Patent No.: US 11,487,772 B2
(45) Date of Patent: Nov. 1, 2022

(54) MULTI-PARTY DATA JOINT QUERY METHOD, DEVICE, SERVER AND STORAGE MEDIUM

(71) Applicant: BAIDU ONLINE NETWORK TECHNOLOGY (BEIJING) CO., LTD., Beijing (CN)

(72) Inventors: Zhi Feng, Beijing (CN); Yu Zhang, Beijing (CN); Sen Zhang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 125 days.

(21) Appl. No.: 16/727,793

(22) Filed: Dec. 26, 2019

(65) Prior Publication Data
US 2020/0210423 A1      Jul. 2, 2020

(30) Foreign Application Priority Data
Dec. 28, 2018   (CN) .......................... 201811630235.3

(51) Int. Cl.
| | |
|---|---|
| *G06F 16/2458* | (2019.01) |
| *G06F 16/22* | (2019.01) |
| *G06F 16/242* | (2019.01) |
| *G06F 16/2455* | (2019.01) |

(52) U.S. Cl.
CPC ...... *G06F 16/2471* (2019.01); *G06F 16/2282* (2019.01); *G06F 16/244* (2019.01); *G06F 16/24554* (2019.01)

(58) Field of Classification Search
CPC ............. G06F 16/2471; G06F 16/2282; G06F 16/244; G06F 16/24554
See application file for complete search history.

(56) References Cited

U.S. PATENT DOCUMENTS

| | | | |
|---|---|---|---|
| 10,614,242 B2 * | 4/2020 | Rogers | ..................... G06F 21/72 |
| 2016/0140174 A1 * | 5/2016 | Weyerhaeuser | .. G06F 16/24542 707/718 |
| 2016/0171068 A1 * | 6/2016 | Hardin | .................. G06F 16/275 707/610 |
| 2016/0182222 A1 * | 6/2016 | Rane | ...................... H04L 9/008 713/168 |

(Continued)

OTHER PUBLICATIONS

European Patent Application No. 19219763.0 extended Search and Opinion dated May 8, 2020, 11 pages.

(Continued)

*Primary Examiner* — Dangelino N Gortayo
(74) *Attorney, Agent, or Firm* — Lathrop GPM LLP

(57) ABSTRACT

The present disclosure provides a multi-party data joint query method, a device, a server and a storage medium. The multi-party data joint query method executed by a manager includes: analyzing a multi-party joint query sentence to obtain a logical execution plan; processing the logical execution plan according to providers of respective nodes in the logical execution plan to obtain a physical execution plan of each provider; and generating a query instruction of each provider according to the physical execution plan of each provider, and sending the query instruction to respective provider. The query instruction is configured to instruct the providers to perform a query cooperatively.

17 Claims, 6 Drawing Sheets

(56) References Cited

U.S. PATENT DOCUMENTS

| | | | | |
|---|---|---|---|---|
| 2017/0193054 A1* | 7/2017 | Tang | .................... | G06F 16/2458 |
| 2017/0322988 A1* | 11/2017 | Weyerhaeuser | .. | G06F 16/24554 |
| 2018/0096166 A1* | 4/2018 | Rogers | .................... | H04L 63/04 |
| 2018/0349404 A1* | 12/2018 | Noh | .................. | G06F 16/24534 |
| 2019/0138640 A1* | 5/2019 | Pal | .......................... | G06F 16/27 |

OTHER PUBLICATIONS

Guller, Mohammed; Chapter 3—Spark Core; Big Data Analytics with Spark: a Practitioner's Guide to Using Spark for Large Scale Data Analysis; Dec. 25, 2015; pp. 35-59.

Anonymous: "What are DAG and Physical Execution Plan in Apache Spark" Sep. 28, 2018 Retrieved from the Internet Apr. 23, 2020 https://web.archive.org/web/20180928125955/https://www.tutorialkart.com/apache-spark/dag-and-physical-execution-plan/ 8 pages.

* cited by examiner

MULTI-PARTY DATA JOINT QUERY METHOD, DEVICE, SERVER AND STORAGE MEDIUM

CROSS-REFERENCE TO RELATED APPLICATION

This application claims priority to and benefits of Chinese Patent Application Serial No. 201811630235.3, filed with the State Intellectual Property Office of P. R. China on Dec. 28, 2018, the entire content of which is incorporated herein by reference.

TECHNICAL FIELD

The present disclosure relates to the field of data processing technique, and more particularly, to a multi-party data joint query method and a server.

BACKGROUND

With the rapid development of Internet technology, data are shared between enterprises. Under normal circumstances, the data shared between enterprises are personal and confidential, such as ID card information, mobile phone numbers and bank card numbers of users. Therefore, it is important to protect the security of the query data while sharing the query data between enterprises.

SUMMARY

Embodiments of the present disclosure provide a multi-party data joint query method executed by a manager, the method includes: analyzing a multi-party joint query sentence to obtain a logical execution plan; processing the logical execution plan according to providers of respective nodes in the logical execution plan to obtain a physical execution plan of each provider; and generating a query instruction of each provider according to the physical execution plan of each provider, and sending the query instruction to respective provider, in which the query instruction is configured to instruct the providers to perform a query cooperatively.

Embodiments of the present disclosure provide a multi-party data joint query method executed by a provider, the method includes: receiving a query instruction from a manager, in which the query instruction is determined by the manager through: analyzing a multi-party joint query sentence to obtain a logical execution plan, processing the logical execution plan according to providers of respective nodes in the logical execution plan to obtain a physical execution plan of each provider, and generating a query instruction of each provider according to the physical execution plan of each provider; and executing the received query instruction and obtaining a query result.

Embodiments of the present disclosure provide a server, and the server includes: one or more processors; a storage device for storing one or more programs. When the one or more programs are executed by the one or more processors, the one or more processors are caused to implement the multi-party data joint query method according to any embodiments of the present disclosure.

DETAILED DESCRIPTION

The present disclosure will be described in detail below with reference to the accompanying drawings and the embodiments. It should be understood that, the specific embodiments described herein are only used to explain the present disclosure rather than to limit the present disclosure. In addition, it should also be noted that, for convenience of description, only some but not all structures related to the present disclosure are illustrated in the accompanying drawings.

With the rapid development of Internet technology, data are shared between enterprises. Under normal circumstances, the data shared between enterprises are personal and confidential, such as ID card information, mobile phone numbers and bank card numbers of users. Therefore, it is very important to protect the security of the query data while sharing the query data between enterprises. However, under the premise of ensuring the security of the query data in the query methods of the related art, the query efficiency continues to decrease with the increase in the amount of data, and the response time of query becomes longer.

Thus, embodiments of the present disclosure provide a multi-party data joint query method, a multi-party data joint query device, a server and a storage medium.

Figure 1:
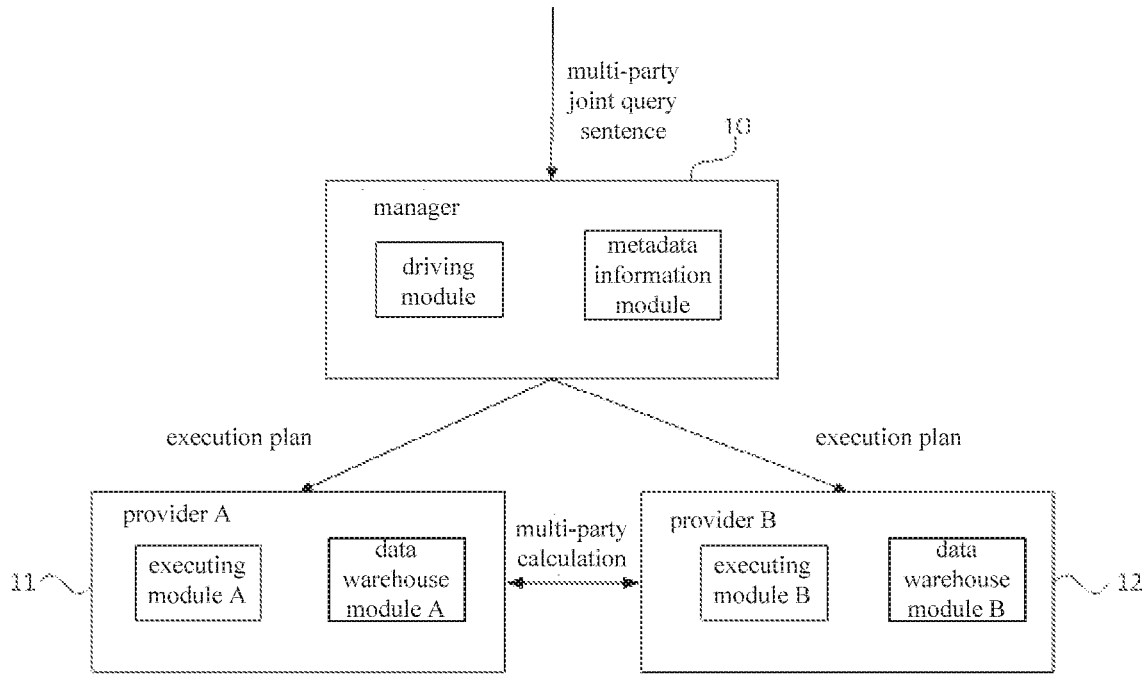
FIG. 1 is a schematic diagram of an overall query process for a two-party data joint query according to an embodiment of the present disclosure.

Before introducing the embodiments of the present disclosure, the application scenarios of the embodiments of the present disclosure are described first. The multi-party data joint query method, device, server and storage medium according to the embodiments of the present disclosure may be applicable for a scenario where a plurality of data providers cooperate to perform data query based on a multi-party joint query sentence, such as a case where a plurality of data providers cooperate to perform data query on privacy data from a plurality of providers based on a multi-party joint query sentence. Specifically, the data of each data provider are stored in a respective data warehouse (respective security domain), and meta information that needs to be disclosed by each provider may be identical or different. Data query can only be performed on the multi-party joint query sentence after the respective data providers pass audit. The data of each provider can be a variety of privacy data. Through thee multi-party joint query, the data of each provider can be statistically queried. The calculation results are disclosed to each provider without leaking the metadata during the computing process. For example, a specific process of multi-party data joint query is illustrated in FIG. 1. A manager 10 includes a metadata information module and a driving module. The metadata information module is configured to collect and manage the metadata. The driving module is configured to analyze a query sentence into an execution plan. The manager 10 sends the analyzed execution plan to a data provider A11 and a data provider B12. Each data provider includes an executing module and a data warehouse module. The executing module performs multi-party calculation based on its data warehouse module and the received execution plan, to complete the data query operation. The executing module may be a multi-party computing program deployed on a current data provider. On the basis, the technical solutions of the embodiments of the present disclosure are described below.

Embodiment 1

Figure 2:
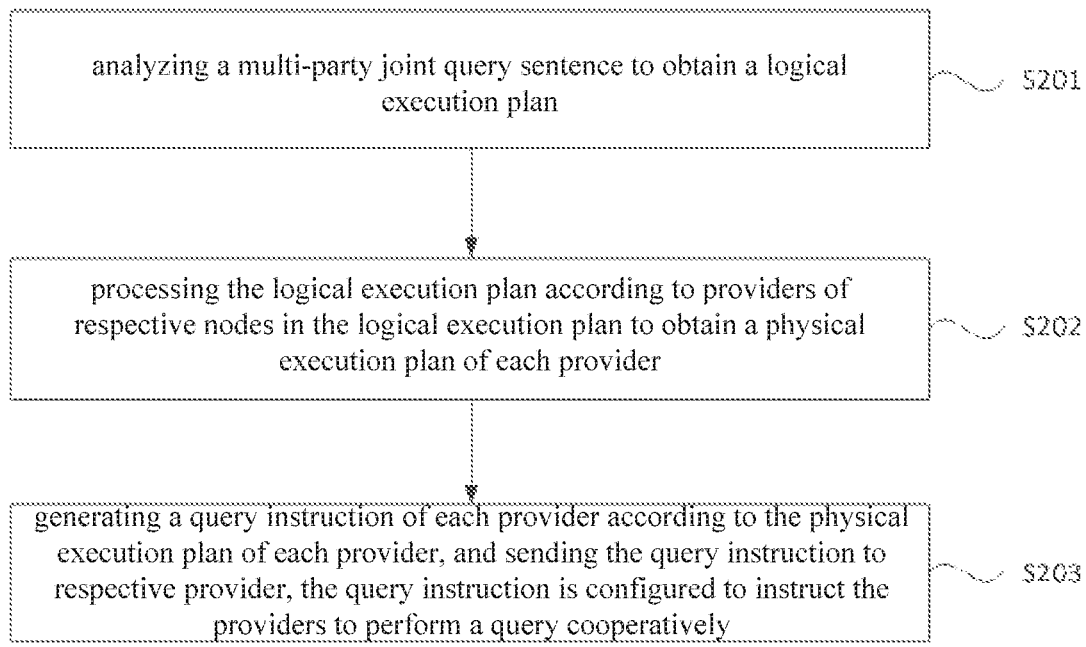
FIG. 2 is a flowchart of a multi-party data joint query method according to an embodiment of the present disclosure.
Figure 3:
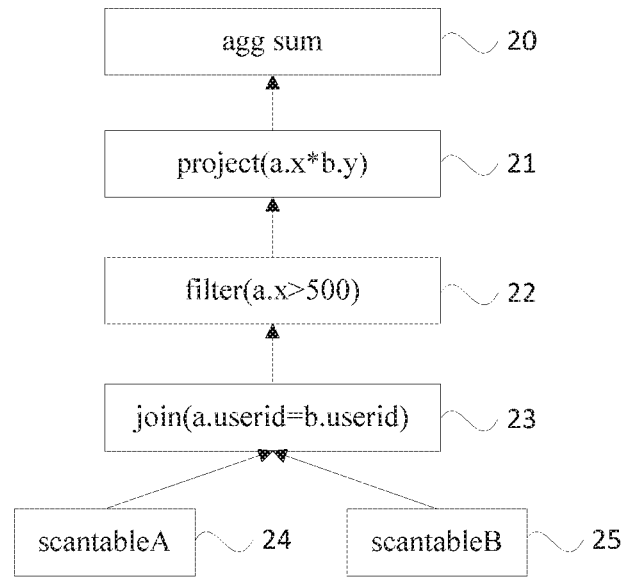
FIG. 3 is a schematic diagram of a logical execution plan obtained by analyzing a multi-party joint query sentence according to an embodiment of the present disclosure.
Figure 4:
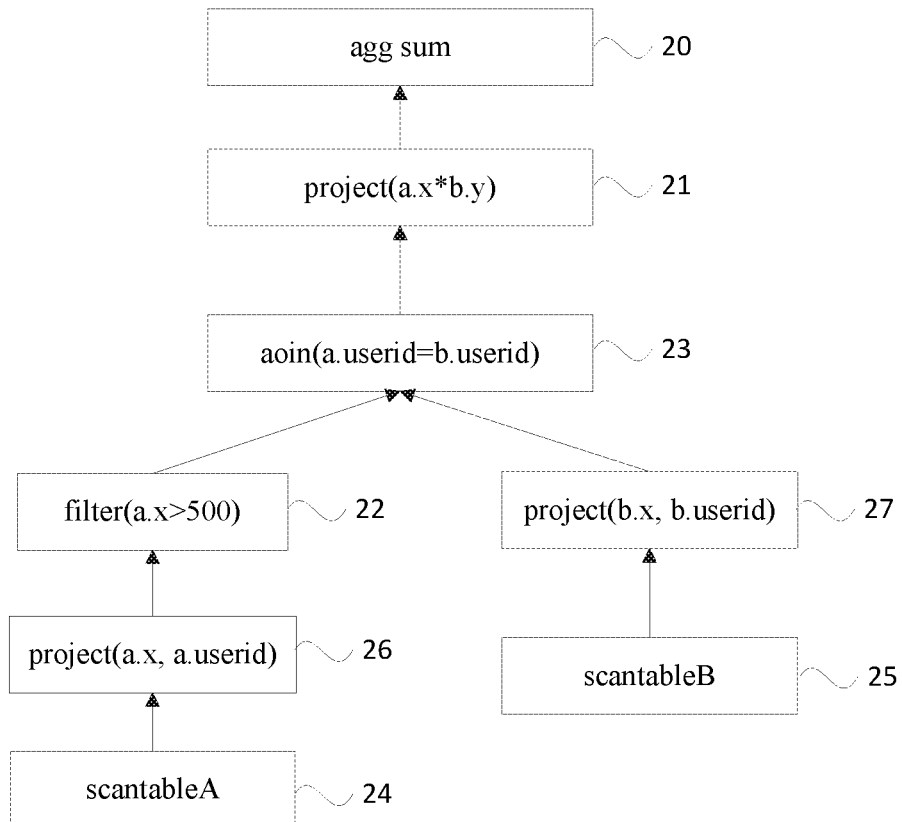
FIG. 4 is a schematic diagram of an optimized logical execution plan according to an embodiment of the present disclosure.

FIG. 2 is a flowchart of a multi-party data joint query method according to an embodiment of the present disclosure. FIG. 3 is a schematic diagram of a logical execution plan obtained by analyzing a multi-party joint query sentence according to an embodiment of the present disclosure. FIG. 4 is a schematic diagram of an optimized logical execution plan according to an embodiment of the present disclosure. This embodiment may be applicable for a case where joint query is performed on multi-party data, for example, a case where joint query is performed on multi-party privacy data. The method may be executed by a multi-party data joint query device configured in a manager or a server provided by embodiments of the present disclosure, and the device may be implemented by hardware and/or software. The manager may be a manager server that provides a data query service, which can analyze the query sentences sent by the user and generate data query instructions for different data providers, and the data providers cooperate with each other to complete this data query.

As illustrated in FIGS. 2-4, a detailed process includes following actions.

At block S201, a multi-party joint query sentence is analyzed to obtain a logical execution plan.

The multi-party joint query sentence may refer to a data query sentence about a plurality of providers, and the data query sentence may be written by program codes according to current query requirements based on database query and programming language. For example, the data query sentence may be a SQL sentence written for the requirements of query data. Alternatively, in the following embodiments of the present disclosure, the SQL sentence is used as a query sentence to introduce a multi-party data joint query solution, but the present disclosure is not limited thereto. The logical execution plan can be an execution plan set for the query sentence, i.e., a detailed execution plan about how a whole query sentence is executed, and when each keyword and each clause portion is executed. The plan itself is a directed acyclic graph. Alternatively, in some embodiments of the present disclosure, the process of analyzing the multi-party joint query sentence may be: segmenting and analyzing each code in the multi-party joint query sentence to determine meaning of each code, and an operator of each code and time to execute each code, and further sorting out the logical execution plan for the detailed execution of the query sentence.

For example, the multi-party joint query sentence is an SQL sentence: select sum (a.x* b.y) from A a, B b where a.userid=b.userid and a.x>500.

It can be seen by analyzing the SQL sentence that the sentence contains two providers, in which one is a table a of the provider A, and the other is a table b of the provider B. An operation executed by the sentence is to sum the products of the data x in the table a and the data y in the table b, that is, sum (a.x*b.y), and there are following two restrictions on the tables a and b for the product and summing operation: 1) the userid fields of the two tables used in performing the product and summing operation are identical, that is, a.userid=b.userid; and 2) a value of x in table a used in performing the product and summing operation is greater than 500, that is, a.x>500. From the above analysis, a "join operator" (also called an intersection operator) that executes a "a.userid=b.userid" code, a "filter operator" that executes a "a.x>500" code, and a "project operator" and an "agg operator" that execute a "sum (a.x*b.y)" code can be determined. When determining the code execution order, the "a.userid=b.userid" code and the "ax>500" code are executed first to determine that the data of table a and table b satisfies the requirements of the product and summing operation, and then the operation "sum (a.x*b.y)" is executed. When performing the "sum (a.x*b.y)" operation, the product operation is required to be executed first and then the summing operation is executed. Therefore, the logical execution plan is obtained as illustrated in FIG. 3. That is, the data of provider A and provider B are obtained through nodes 24 and 25, and then data with same userid fields in table a and table b are determined through the node 23. The data with x value greater than 500 in table a is selected from the data determined through nodes 23 based on the node 22. Finally, the node 21 is executed to calculate the product of the x and y values, and the node 20 is executed to perform the summing operation on the product.

In detail, the manager device may use an open source tool antlr to segment and analyze the SQL sentence, convert the SQL into an abstract syntax tree (AST), and use calcite to edit the abstract syntax tree into the logical execution plan.

Alternatively, after analyzing the multi-party joint query sentence and obtaining the logical execution plan, the method may further include: optimizing the obtained logical execution plan based on an optimization principle. In detail, the obtained logical execution plan may be optimized from the following aspects: expression simplification, predicate pushdown, and removing useless fields from a query field. For example, a result of the optimization operation performed on the logic in FIG. 3 is illustrated in FIG. 4. Node 26 and node 27 are added. Firstly, the provider A performs the operations at nodes 24, 26, and 22 locally in sequence, and the provider B performs the operations at nodes 25 and 27 in sequence locally, and then subsequent cooperative operations at nodes 23, 21, and 20 are performed.

At block S202, the logical execution plan is processed according to providers of respective nodes in the logical execution plan to obtain a physical execution plan of each provider.

The physical execution plan can be an order in which the query sentences are actually executed. The physical execution plan is determined by a large number of calculations and analysis by a sentence analyzer, an optimizer, and other components in a relational engine of respective database systems.

Alternatively, processing the logical execution plan according to providers of respective nodes in the logical execution plan may be based on the respective providers involved in the logical execution plan. When the algorithm is performed for each node in the logical execution plan, the logical execution plan is processed according to a provider corresponding to the node, to generate the physical execution plan corresponding to each provider. For the logical execution plan shown in FIG. 4, which includes the provider A and the provider B, the logical execution plan is processed based on the provider corresponding to each node, to obtain a physical execution plan corresponding to each provider (i.e., the provider A and the provider B). Alternatively, the physical execution plans corresponding to the providers may be identical. For example, for each provider, the process of processing the logical execution plan to obtain the physical execution plan may be implemented by a Spark Strategies class. In detail, the Spark Strategies class may be a Strategy interface provided based on Catalyst in the manager device. This interface implements some strategies for analyzing logical execution plans (including originally generated logical execution plans or optimized logical execution plans), and mapping the logical execution plans to the physical execution operation, and then determining a mark type of an operator at each node in the physical execution plan of each provider, so as to obtain the final physical execution plan. The mark type includes a unilateral computing operator, a multi-party non-mixed operator or a multi-party mixed column operator. In detail, how to determine the mark type of each operator in the physical execution plan of each provider is described in detail in the following embodiments.

At block S203, a query instruction of each provider is generated according to the physical execution plan of each provider, and the query instruction is sent to respective provider, in which the query instruction is configured to instruct the providers to perform a query cooperatively.

The query instruction may be a specific instruction for instructing each provider to perform data query, including at least an operator configured to perform a data query operation, query data, the physical execution plan, and a performer.

Alternatively, the process of generating the query instruction of each provider according to the physical execution plan of each provider may include follows. For each provider, based on the physical execution plan of the provider, converting the physical execution plan into a query instruction in a json format through a preset interface on the manager device. The converted execution command is sent to the corresponding provider, and the data query is carried out cooperatively by the respective providers.

Alternatively, for a provider, a query instruction generated by a physical execution plan may be composed of multiple sub-execution commands, and each sub-execution command may be a query instruction generated by sorting according to the physical execution plan, or the sub-execution commands are marked with an execution order of the respective sub-execution commands. When provider nodes receive the query instruction, the sub-execution commands are executed in turn according to the execution order marked on the sub-execution commands.

This embodiment provides a multi-party data joint query method. By processing the logical execution plan obtained by analyzing the multi-party joint query sentence, the physical execution plan of each provider is obtained, and then the query instruction of each provider is generated and sent to respective provider. Thus, a multi-party computing method that protects the security of the provider data is implemented, and the data query efficiency is improved on the premise of ensuring the security of the query data.

Embodiment 2

Figure 5:
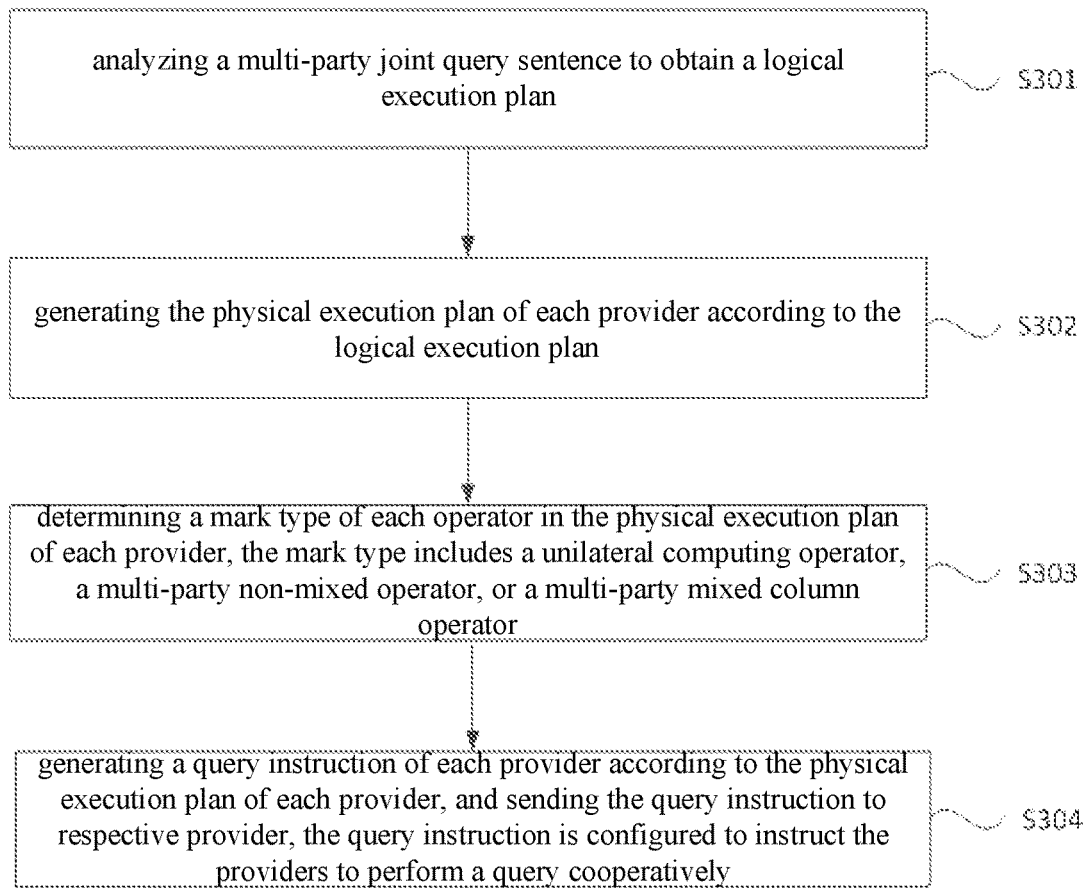
FIG. 5 is a flowchart of a multi-party data joint query method according to an embodiment of the present disclosure.
Figure 6:
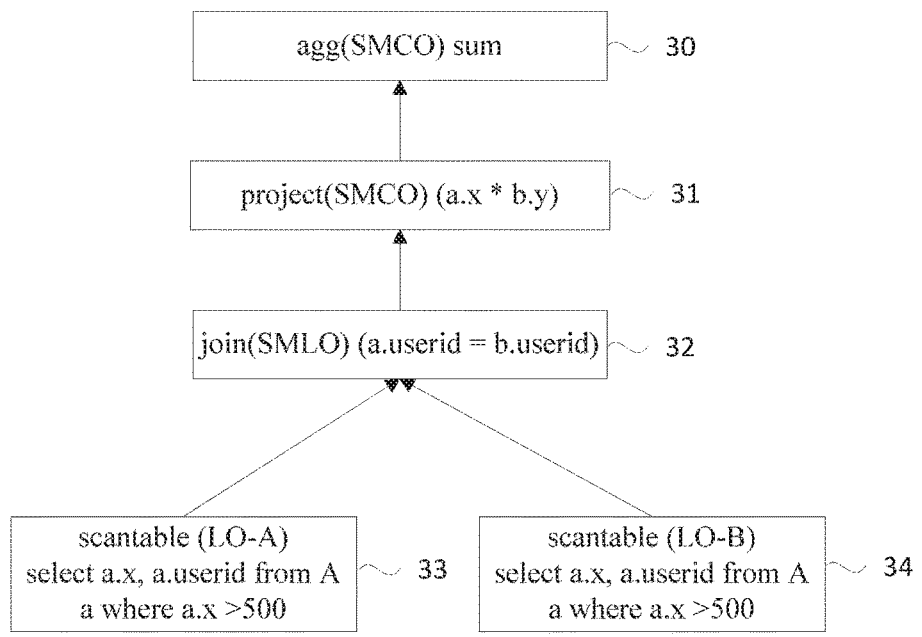
FIG. 6 is a schematic diagram of a physical execution plan marked with operator mark types according to an embodiment of the present disclosure.

FIG. 5 is a flowchart of a multi-party data joint query method according to an embodiment of the present disclosure. FIG. 6 is a schematic diagram of a physical execution plan marked with operator mark types according to n embodiment of the present disclosure. This method is further optimized on the basis of the above embodiments, and provides a description of obtaining a physical execution plan of each provider by processing a logical execution plan according to providers of respective nodes in the logical execution plan. As illustrated in FIGS. 5-6, the method may include following actions.

At block S301, a multi-party joint query sentence is analyzed to obtain a logical execution plan.

At block S302, a physical execution plan of each provider is generated respectively according to the logical execution plan.

For example, generating the physical execution plan of each provider respectively according to the logical execution plan may include a process that a SparkStrategies class implements processing the logical execution plan according to the logical execution plan to obtain the physical execution plan. In detail, a Strategy interface provided based on Catalyst in a manager device is employed, this interface implements some strategies for analyzing logical execution plans (including originally generated logical execution plans or optimized logical execution plans), and mapping the logical execution plans to the physical execution operation to generate the physical execution plan of the provider.

Alternatively, before generating the physical execution plan of each provider respectively according to the logical execution plan, the method further includes: if a node in the logical execution plan belongs to a unique provider, combining the node and sub-nodes of the node as a unilateral computing node.

In detail, for the logical execution plan, it can be judged from top to bottom whether the data involved in each node is derived from a same provider, and if so, the node and the sub-nodes of the node are regarded as a unilateral computing node, and subsequent judgment is not performed. Otherwise, the node is a multi-party computing node, continues to determine whether the sub-nodes of the node are unilateral computing nodes. For example, as shown in FIG. 4, the data related to nodes 20, 21, and 23 include data from both the provider A and the provider B, which are not unique. Therefore, nodes 20, 21, and 23 belong to multi-party nodes. The data of the node 22 belongs to the unique provider A, thus the node 22 and its sub-nodes 26 and 24 serve as a unilateral (provider A) computing node. The data of the node 27 belongs to the unique provider B, then node 27 and its sub-nodes 25 serve as a unilateral (provider B) computing node. At this time, the obtained physical execution plan is shown in FIG. 6, where node 33 is a unilateral computing node obtained through the combination of the node 22 and its sub-nodes 26 and 24 in FIG. 4, and node 34 is a unilateral computing node obtained through the combination of the node 27 and its sub-node 25 in FIG. 4.

At block S303, a mark type of each operator in the physical execution plan of each provider is determined, in which the mark type includes a unilateral computing operator, a multi-party non-mixed operator, or a multi-party mixed column operator.

Each operator in the physical execution plan calculates data in a data table, and each data table is generally a data table storing multiple columns of data. The unilateral computing operator (that is, the LO operator) may refer to that data in a calculation result (that is, an obtained data table) obtained by computing through the operator belongs to a unique provider, that is, all columns in the entire data table come from one provider. The multi-party non-mixed computing operator (that is, the SMLO operator) may refer to that the data in same column in the calculation result (that is, the obtained data table) obtained by computing through the operator is derived from one party. For example, if the calculation result table of an operator has 5 columns of data, 1-3 columns of the data are from Provider A, and 4-5 columns of the data are from Provider B, then the operator is a multi-party non-mixed calculation operator. A multi-party mixed column operator (that is, an SMCO operator) may refer to that data in same column in the calculation result (that is, the obtained data table) obtained by the operator is derived from a plurality of providers. For example, if a column of data stored in the calculation result table of a certain operator is obtained based on the data of both the provider A and the provider B, the operator is a multi-party mixed column operator.

Alternatively, when determining the mark type of each operator in the physical execution plan of each provider, it can be determined according to the number of providers corresponding to the data in the data table obtained by the calculation of each operator. If the data in the data table correspond to one provider, the operator is a unilateral operator. For example, the data in the data table calculated by the scantable operator in the node 33 in the physical execution plan in FIG. 6 belongs to the provider A, then the mark type of the scantable operator in the node 33 is a unilateral operator. If data in one column of data in the data table corresponds to one provider, the operator is a multi-party non-mixed computing operator. For example, after performing the intersection operation by the join operator in the node 32 in the physical execution plan in FIG. 6, one column in the obtained data table is data values in table a of the provider A, and the other column is data values in table b of the provider B. For one column, the provider of the data is unique, thus the mark type of the join operator in the node 32 is a multi-party non-mixed computing operator. If the sources of data in one column in the data table correspond to a plurality of providers, the operator corresponding to the data table is a multi-party mixed column operator. For example, after performing a product operation on the project operator in node 31 in the physical execution plan in FIG. 6, the obtained data is calculated according to the x value in table a and the y value in table b. That is, the result is derived from both the provider A and the provider B. Then the mark type of the project operator in node 31 is a multi-party mixed column operator. The agg operator in node 30 is obtained by summing the calculation results of the project operator in the node 31. Since one column of data in the data of the calculation result of the project operator is derived from a plurality of providers, the data of one column in the calculation result after summing by the agg operators in node 30 is derived from a plurality of providers. Therefore, the type of the agg operator in the node 30 is marked as a multi-party mixed column operator.

Alternatively, after the mark type of each operator in the physical execution plan is determined, the each operator in the physical execution plan of each provider is marked with the determined mark type.

At block S304, a query instruction of each provider is generated according to the physical execution plan of each provider, and the query instruction is sent to respective provider, in which the query instruction is used to instruct the providers to perform a query cooperatively.

For example, when generating the query instruction of each provider according to the physical execution plan of each provider, the query instruction with respective operator marked with a mark type may be generated according to the physical execution plan of each provider and the mark type of each operator in each plan. That is, an operator corresponding to each execution command in the query instruction is marked with a mark type corresponding to the operator. The query instruction marked with each operator mark type is sent to each provider, so that each provider executes a corresponding query operation according to the query instruction marked with each operator mark type.

This embodiment provides a multi-party data joint query method. By processing the logical execution plan obtained by analyzing the multi-party joint query sentence, the physical execution plan of each provider is obtained, and the mark type of each operator in the physical execution plan of each provider is determined. According to the physical execution plan of each provider and the mark type of each operator in each plan, the query instruction marked with mark types of the respective operators is generated and sent to respective provider. The query instruction sent by the manager to each provider includes the mark type of each operator, so that each provider can use different execution methods according to the mark type of the operator, thus further improving the efficiency of data query execution.

Embodiment 3

Figure 7:
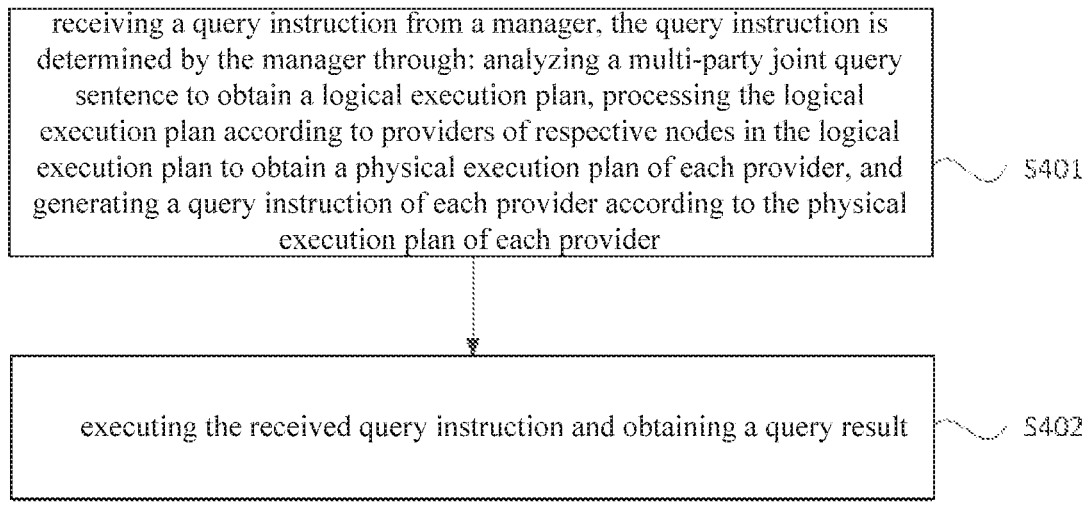
FIG. 7 is a flowchart of a multi-party data joint query method according to an embodiment of the present disclosure.

FIG. 7 is a flowchart of a multi-party data joint query method according to an embodiment of the present disclosure. This embodiment may be applicable to a case where, after the manager in the foregoing embodiments generates the query instruction of each provider and sends it to a corresponding provider, respective provider performs data query according to the received query instruction. The method may be executed by a multi-party data joint query device configured in a provider or a server provided by the embodiments of the present disclosure, and the device may be implemented in a hardware and/or software. As illustrated in FIG. 7, the method includes the following actions.

At block S401, a query instruction is received from a manager, in which the query instruction is determined by the manager through: analyzing a multi-party joint query sentence to obtain a logical execution plan, processing the logical execution plan according to providers of respective nodes in the logical execution plan to obtain a physical execution plan of each provider, and generating a query instruction of each provider according to the physical execution plan of each provider.

For example, the manager analyzes the received multi-party joint query sentence to obtain the logical execution plan. After optimizing the obtained logical execution plan, the optimized logical execution plan is adopted and processed according to the provider to which each node belongs, to obtain the physical execution plan of each provider, and to determine the mark type of each operator in the physical execution plan of each provider, such that a final physical execution plan is obtained, and the query instruction of each provider is generated and sent to corresponding providers respectively. The respective providers receive a query instruction issued to local by the manager. It should be noted that the specific process of generating the query instruction of a local provider issued by the manager may be the same as in the foregoing embodiments, and details are not described herein again. Alternatively, after the provider receives the task, the data warehouse administrator of each provider may audit the task first, and after audit, a multi-party computing task is executed to wait cooperative execution of other parties.

At block S402, the received query instruction is executed and a query result is obtained.

Alternatively, since each algorithm in the query instruction in the embodiment of the present disclosure is marked with a mark type of the algorithm, executing the received query instruction may include follows. The current operator to be executed in the query instruction is executed according to a mark type and a data provider of the current operator. Specifically, the mark type of the current algorithm includes a unilateral computing operator, a multi-party non-mixed operator, and a multi-party mixed column operator. For one query instruction, the provider needs to use different execution methods for operators of different mark types. For operators of a same mark type, different execution methods may be adopted according to the specific algorithm of the operator. In detail, a specific execution mode of the current operator based on the mark types and data providers of different operators is described in detail in the following embodiments.

For example, after receiving the corresponding query instruction, each provider executes the current operator to be executed in the query instruction according to the mark type and the data provider of the current operator, and the providers query the data cooperatively. Alternatively, when each provider node cooperates in the data query, it may be firstly ensured that the network link between the providers is connected. When the query instruction is received, each node operator is traversed sequentially according to the backward traversal order (that is, an order of executing the leaf nodes first and then the root node) based on the physical execution plan, to complete the execution of the data query operation cooperatively. After completing this data query, if a top-level node is a SMLO node, data at one side is synchronized to the other side. If the top-level node is a SMCO node, the query result data is displayed according to a multi-party computing protocol.

This embodiment provides the multi-party data joint query method. By receiving the query instruction marked with each operator mark type and issued by the manager, the current operator to be executed is executed and data query is performed cooperatively according to the mark type and the data provider of the current operator in the query instruction. A multi-party calculation method is implemented to protect the data security of the provider, and different execution methods are adopted according to the types of operator marks, thereby further improving the efficiency of data query execution.

Embodiment 4

Figure 8:
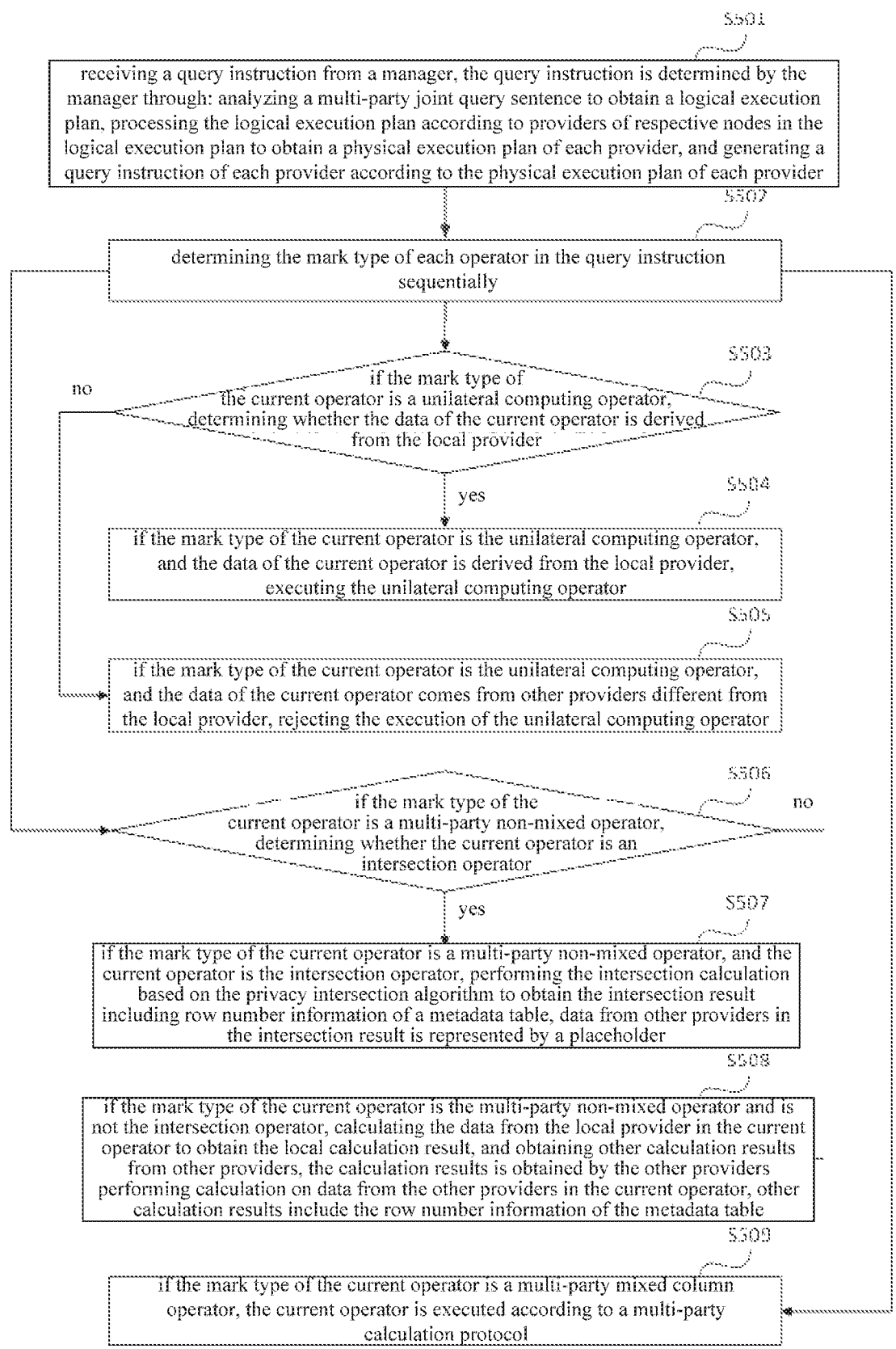
FIG. 8 is a flowchart of a multi-party data joint query method according to an embodiment of the present disclosure.

FIG. 8 is a flowchart of a multi-party data joint query method according to an embodiment of the present disclosure. This method is further optimized on the basis of the foregoing embodiments, and specifically introduces the execution of the current operator to be executed according to the mark type and data provider of the current operator in the query instruction. As illustrated in FIG. 8, the method includes the following actions.

At block S501, a query instruction of a local provider issued by a manager is received, in which the query instruction is determined by the manager through: analyzing a multi-party joint query sentence to obtain a logical execution plan, processing the logical execution plan according to providers of respective nodes in the logical execution plan to obtain a physical execution plan of each provider, and generating a query instruction of each provider according to the physical execution plan of each provider.

At block S502, the mark type of each operator in the query instruction is determined sequentially.

For example, for each provider, when the received query instruction is executed, each node operator of the provider's physical execution plan is traversed in a backward traversal order to determine the mark type of the operator to be currently executed. A method for executing the current operator According to the mark type of the operator and the specific data provider may include follows.

At block S503, if the mark type of the current operator is a unilateral computing operator, it is determined whether the data of the current operator is derived from the local provider, if yes, an action at block S504 is performed, and if not, an action at block S505 is performed.

If the mark type of the current operator is the unilateral computing operator, it is determined whether the data involved in the query operation to be performed by the current operator is from the local provider (that is, the data comes from its own data warehouse). If yes, the action at block S504 is performed, i.e., the unilateral computing operator is executed. If not, the action at block S505 is executed and the execution of the unilateral computing operator is refused.

At block S504, if the mark type of the current operator is the unilateral computing operator, and the data of the current operator is derived from the local provider, the unilateral computing operator is executed.

For example, if the physical execution plan marked with the operator mark type shown in FIG. 6 is the physical plan of the provider A, when the scantable operator in the node 33 of the physical execution plan is executed, since the data source of the operator is the data in table a of the provider A, that is, the data derives from the local provider, the provider A executes the unilateral computing operator i.e., the scantable operator, and so as to query each data value in table a whose x value is greater than 500.

At block S505, if the mark type of the current operator is the unilateral computing operator, and the data of the current operator comes from other providers different from the local provider, the execution of the unilateral computing operator is rejected.

For example, if the physical execution plan marked with the operator mark type shown in FIG. 6 is the physical plan of the provider B, when the scantable operator in the node 34 of the physical execution plan is executed, since the data source of the operator is the data in table a of provider A, that is, the data comes from a non-local provider, provider B refuses to execute the unilateral computing operator, i.e., the scantable operator.

At block S506, if the mark type of the current operator is a multi-party non-mixed operator, it is determined whether the current operator is an intersection operator. If yes, an action at block S507 is executed, if not, an action at block S508 is executed.

For example, if the mark type of the current operator is a multi-party non-mixed operator, it is determined whether the current operator is the intersection operator, i.e., an operator performing an intersection operation, and if yes, the action at block S507 is executed and the unilateral calculation operator is executed, if not, the action at block S508 is executed, and an execution method of a unilateral computing operator different from that of the intersection operator is executed.

At block S507, if the mark type of the current operator is a multi-party non-mixed operator, and the current operator is the intersection operator, the intersection calculation is performed based on the privacy intersection algorithm to obtain the intersection result including row number information of a metadata table. Data from other providers in the intersection result is represented by a placeholder.

The privacy intersection algorithm may be an algorithm that performs an intersection operation on private data. The privacy intersection algorithm may be a Diffie-Hellman fast intersection algorithm, or other algorithms, which is not limited in this embodiment. The row number data of the metadata table may be specific information about the number of rows or columns in a data table where certain data is located.

For example, for the physical execution plan marked with an operator mark type shown in FIG. 6, when executing the intersection operator in the node 32 of the physical execution plan, the intersection calculation is performed according to a Diffie-Hellman fast intersection algorithm (i.e., the privacy intersection algorithm) on the row number of the userid field in the table a and the row number of the userid field in the table b corresponding to the current intersection operation. An intersection result including the row number information of the metadata table is obtained by reconstructing data according to a calculation result (including the intersection data and the row number information of the intersection data) obtained by performing the intersection operation according to the privacy intersection algorithm. For example, if the userid field data in table a is 1,2,3,4, and 5, and the userid field data in table b is 2,4,5,6, and 7, then the Diffie-Hellman fast intersection algorithm is used to perform the intersection operation to obtain intersection data 2, 4, and 5. The intersection data 2, 4, 5 and the row number information of the intersection data are used as the intersection result. In FIG. 6, both the provider A and the provider B execute the intersection operator, but in an intersection result provided by any one of the two providers, data from the other party is represented by placeholders (such as stubs).

At block S508, if the mark type of the current operator is the multi-party non-mixed operator and is not the intersection operator, the data from the local provider in the current operator is calculated to obtain the local calculation result, and other calculation results are obtained from other providers, the calculation results is obtained by the other providers performing calculation on data from the other providers in the current operator. Other calculation results include the row number information of the metadata table.

The current operator is an operator other than an intersection operator, and may include, but is not limited to, at least one of an expression computing operator, a filtering operator, a sorting operator, and an aggregation operator.

For example, if the current operator is the multi-party non-mixed operator other than a non-intersecting operator, the current operator calculates the data from the local data warehouse, and refuses to perform calculation on the data of other providers and waits for other providers to calculate the data from other providers in the current operator and obtains the calculation results from other providers. Alternatively, after the calculation of the data from the local data warehouse in the current operator is completed for each provider, the calculation result is synchronized to other providers, so that the data of the calculation results are synchronized by other providers upon receipt. In order to ensure the data privacy of each provider, when each provider sends calculation results to other providers, the provider only sends the row number information of the metadata table, instead of the specific data. When the calculation results are synchronized by other providers upon receiving the calculation results of the current operator, only the row numbers are synchronized, instead of the specific data values.

In detail, if the current operator is a project operator, and the data for executing the operator comes from the local data warehouse, the corresponding data is obtained from the local data warehouse to execute the project operator, and the row number information of the metadata table of the calculation result is provided to other providers. If the data for executing the operator comes from a data warehouse of other provider, the row number information of the metadata table of the calculation results sent by the other providers is received. The data in the calculation results are represented by placeholders. That is, specific data in a calculation result of other provider is represented by a placeholder at the local provider.

If the current operator is a filter operator, and the data for executing the operator comes from the local data warehouse, the corresponding data are obtained from the local data warehouse and after the operation of the filter operator is performed, the filtered row number information of the metadata table of the operation result are sent to other providers. If the data for executing the operator comes from the data warehouses of other providers, the row number information of the metadata table of other calculation results is received from other providers. For example, the filter operator corresponds to provider A. Provider A executes the filter operator and the remaining results after filtering are data in the rows 1, 3, and 4, and then the row numbers of 1, 3, and 4 are sent to the provider B, so that the provider B synchronizes the filtering result. Alternatively, data in other calculation results can also be represented by placeholders.

If the current operator is a sort operator or an aggregation operator, and the data for executing the operator comes from the local data warehouse, the corresponding data is obtained from the local data warehouse. For the sort operator or the agg operator, sort calculation or aggregation calculation is performed on the obtained data by column respectively, and the row number information of the metadata table of the calculation result is sent to other providers. If the data that implements the algorithm comes from the data warehouse of other providers, the row number information of the metadata table of other calculation results sent by the other provider is received. For example, if the current operator is a sorting operator, and the local provider performs the sorting operation on the metadata: 100, 33, 444, the sorting result 33, 100, 444 is obtained. This sorting is to change the row number information of the metadata from 1, 2, 3 to 2, 1, 3, and the newly sorted row number information 2, 1, 3 is synchronized to the other providers that execute the data query cooperatively. If the current operator is an aggregation operator, and the metadata of the local provider is: 1, 2, 33, 55, 55 group by country (*),the result of the aggregation operator is 1, 2; 33, 1; 55, 2, the data row numbers is changed to: 1, 1, 2; 3, 3; 4, 4, 5 after executing the aggregation operator, the aggregated row number information 1, 1, 2; 3, 3; 4, 4, 5 is synchronized to each of the other providers who cooperates in data query. Alternatively, data in other calculation results can also be represented by placeholders.

Alternatively, if the current operator is a sorting operator or an aggregation operator, after other providers perform calculation on data from the other providers in the current operator and each provider obtains the calculation results from the other providers, the process further includes performing sorting operation or aggregating operation on local calculation results and calculation results from other providers. Thus, a final processing result is obtained. In detail, all calculation results of the local provider and other providers may be summarized and processed before the final calculation result of the sorting operator and the aggregation operator is obtained. That is, if the current operator is the sorting operator, the local sorting result and the received sorting results of respective providers are summarized and sorted to obtain a final sorting result. If the current operator is the aggregation operator, the local aggregation result and the received aggregated results of respective providers are summarized and aggregated to obtain a final aggregation result. For example, the current operator is the sorting operator, the local sorting result of provider A is to change a sorting result of 100, 33, 444 in table a to 33, 100, 444. A sorting result received from provider B is to change the sorting result of 23, 56, 111 in table b to 56, 111, 23. At this time, provider A may summarize the local sorting results and the sorting result of provider B. That is, the row number information in table a is changed to 2, 1, 3 and the row number information in table B is changed to 2, 3, 1 as the final sorting result.

If the current operator is a limit operator, the local provider directly obtains the corresponding data from the local data warehouse to perform the limit operator operation, and extracts the data corresponding to the limit operator as the calculation result. For example, if the limit operator is limit 5, the local provider may obtain the data in the first 5 rows of the data table as the calculation result. If the limit operator is limit 5, 10, the local provider may obtain data from the 5th row to the 10th row in the data table as the calculation result.

At block S509, if the mark type of the current operator is a multi-party mixed column operator, the current operator is executed according to a multi-party calculation protocol.

For example, if the mark type of the current operator is a multi-party mixed column operator, such as the agg operator in the node 30 and the project operator in the node 31 illustrated in FIG. 6, the data provider A and the data provider B execute agg or project operators based on the multi-party computing protocol. The multi-party computing protocol may be any of the protocols in the related art that allows multiple parties to coordinate in data query, which is not limited in this embodiment. In detail, the process may include the following steps. It is determined whether the current data has been secretly shared. If not, the current data is secretly shared first. After the current data is secretly shared, each provider holds the data required by a multi-party mixed computing operator for calculation. Then calculation for specific operators (such as the expression operator, the filter operator, the sorting operator, the aggregation operator, and the intersection operator) is performed based on the multi-party computing protocol.

This embodiment provides a multi-party data joint query method, and provides detailed introduction about how to performing the calculation for each mark type of operator, after the provider receives the query instruction marked with each operator's mark type issued by the manager, so as to perform the data query of data cooperatively by various providers. According to the different mark types of operators, different execution methods are used, thus further improving the efficiency of executing data query.

Embodiment 5

Figure 9:
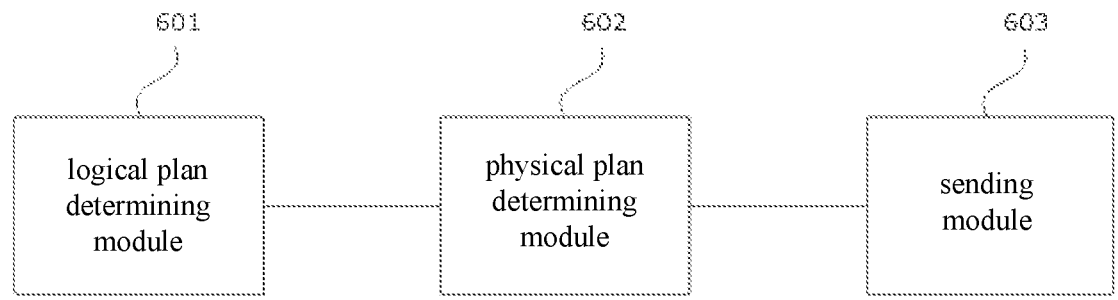
FIG. 9 is a block diagram of a multi-party data joint query device according to an embodiment of the present disclosure.

FIG. 9 is a schematic diagram of a multi-party data joint query device according to an embodiment of the present disclosure.

This device can execute the multi-party data joint query method according to Embodiment 1 or Embodiment 2 of the present disclosure. The device is configured on a manager, and has the corresponding functional modules and beneficial effects of the execution method. As illustrated in FIG. 9, the device includes the following.

A logical plan determining module 601 is configured to analyze a multi-party joint query sentence to obtain a logical execution plan.

A physical plan determining module 602 is configured to process the logical execution plan according to providers of respective nodes in the logical execution plan to obtain a physical execution plan of each provider.

A sending module 603 is configured to generate a query instruction of respective provider according to the physical execution plan of each provider, and send the query instruction to each provider, in which the query instruction is used to instruct the providers to perform a query cooperatively.

This embodiment provides a multi-party data joint query device. By processing the logical execution plan obtained by analyzing the multi-party joint query sentence, the physical execution plan of each provider is obtained, and then the query instructions of each provider are generated and sent to respective provider. Thus, a multi-party computing method that protects the security of the provider data is implemented, and the data query efficiency is improved on the premise of ensuring the security of the query data.

Moreover, the physical plan determining module 602 is configured to generate the physical execution plan of each provider according to the logical execution plan respectively; and determine a mark type of each operator in the physical execution plan of each provider, in which the mark type may include a unilateral computing operator, a multi-party non-mixed operator, or a multi-party mixed column operator.

Furthermore, the device further includes a node combining module, configured to, if a node in the logical execution plan belongs to a unique provider, combine the node and sub-nodes of the node as a unilateral computing node.

Embodiment 6

Figure 10:
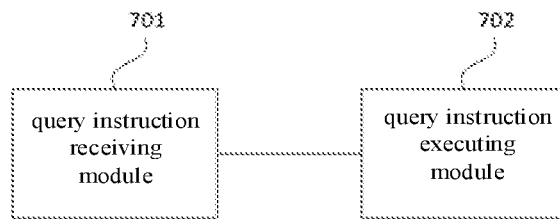
FIG. 10 is a block diagram of a multi-party data joint query device according to an embodiment of the present disclosure.

FIG. 10 is a schematic diagram of a multi-party data joint query device according to an embodiment of the present disclosure. This device can implement the multi-party data joint query method provided in Embodiment 3 or Embodiment 4 of the present disclosure. The device is configured on a provider and has the corresponding functional modules and beneficial effects of the executed method. Alternatively, the multi-party data joint query device configured on the manager side as described in the embodiment 5 may generate a query instruction of each provider and send it to respective provider. The multi-party data joint query device configured on each provider according to this embodiment is specifically configured to receive and execute the query instruction.

As illustrated in FIG. 10, the device includes follows.

A query instruction receiving module 701 is configured to receive a query instruction of a local provider issued by a manager. The query instruction is determined by the manager through: analyzing a multi-party joint query sentence to obtain a logical execution plan, processing the logical execution plan according to providers of respective nodes in the logical execution plan and to obtain a physical execution plan of each provider, and generating a query instruction of each provider according to the physical execution plan of each provider.

A query instruction executing module 702 is configured to execute the received query instruction and obtain a query result.

This embodiment provides a multi-party data joint query device. By receiving the query instruction marked with each operator mark type and issued by the manager, the current operator is executed and data query is performed cooperatively according to the mark type and the data provider of the current operator in the query instruction. A multi-party calculation method is implemented to protect the data security of the provider, and different execution methods are adopted according to the mark types of operators, thereby further improving the efficiency of data query execution.

Furthermore, the query instruction executing module 702 is configured to execute the current operator to be executed according to a marking type and a provider of the current operator to be executed in the query instruction.

Moreover, the query instruction executing module 702 is further configured to: if the mark type of the current operator is a unilateral computing operator and data of the current operator is derived from the local provider, execute the unilateral computing operator; and if the mark type of the current operator is a unilateral computing operator, and the data of the current operator is derived from other providers different from the local provider, refuse to execute the unilateral computing operator.

Furthermore, the query instruction executing module 702 is further configured to: if the mark type of the current operator is a multi-party non-mixed operator and the current operator is an intersection operator, perform intersection calculation based on a privacy intersection algorithm to obtain an intersection result containing row number information of a metadata table, in which data from other providers different from the local provider in the intersection result is represented by a placeholder.

Furthermore, the query instruction executing module 702 is configured to: if the mark type of the current operator is a multi-party non-mixed operator, calculate data derived from the local provider in the current operator to obtain a local calculation result; and obtain calculation results from other providers different from the local provider, in which the calculation results is obtained by the other providers performing calculation on data from the other providers in the current operator the calculation results include row number information of a metadata table.

The current operator includes at least one of an expression computing operator, a filtering operator, a sorting operator, and an aggregation operator.

Further, the above-mentioned device further includes a sorting set processing module, configured to, if the current operator is a sorting operator or an aggregation operator, perform sorting operation or aggregating operation on the local calculation result and the calculation results from other providers after obtaining calculation results from other providers different from the local provider.

Embodiment 7

Figure 11:
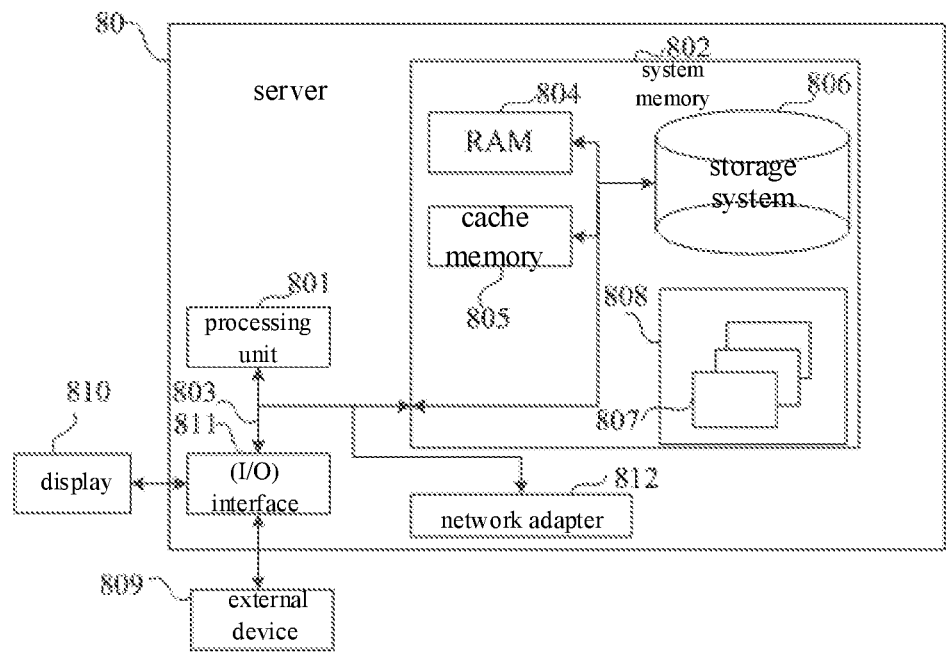
FIG. 11 is a schematic diagram of a server according to an embodiment of the present disclosure.

FIG. 11 is a schematic diagram of a server according to an embodiment of the present disclosure. FIG. 11 is a block diagram of an exemplary server 80 suitable for implementing embodiments of the present disclosure. The server 80 illustrated in FIG. 11 is only an example, and should not impose any limitation on the functions and scope of use of the embodiment of the present disclosure. As illustrated in FIG. 11, the server 80 is expressed in the form of a general-purpose computing device. The components of the server 80 may include, but are not limited to, one or more processors or processing units 801, a system memory 802, and a bus 803 connecting different system components (including the system memory 802 and the processing units 801).

The bus 803 may represent one or more of several bus architectures, including a storage bus or a storage controller, a peripheral bus, an accelerated graphics port, a processor, or a local bus with any of the plurality of bus architectures. For example, the bus architectures include, but not limited to, an industry subversive alliance (ISA) bus, a micro channel architecture (MAC) bus, an enhanced ISA bus, a video electronics standards association (VESA) local bus and a peripheral component interconnect (PCI) bus.

The server 80 typically includes various computer system readable media. These media may be any usable medium that may be accessed by the server 80, including volatile and non-volatile media, removable and non-removable media.

The system memory 802 may include a computer system readable medium in the form of a volatile memory, such as a random access memory (RAM) 804 and/or a cache memory 805. The server 80 may further include other removable/non-removable and volatile/non-volatile computer system storage media. As an example only, a storage system 806 may be configured to read from or write to a non-removable and non-volatile magnetic medium (not shown in FIG. 11, and generally referred as a "hard disk drive"). Although not shown in FIG. 11, a magnetic-disk drive configured to read from or write to a removable and nonvolatile magnetic disk (for example, a "floppy disk"), and an optical-disk drive configured to read from or write to a removable and nonvolatile optical disk, such as a compact disc read-only memory (CD-ROM), a digital video disc-read only memory (DVD-ROM), or other optical media, may be provided. In those cases, each driver may be connected to the bus 803 through one or more data medium interfaces. The system memory 802 may include at least one program product having a set of (e.g., at least one) program modules configured to perform functions in respective embodiments of the present disclosure.

A program/utility 808 including a set of (at least one) program modules 807 may be stored, for example, in the system memory 802. Such program modules 807 include, but not limited to, an operation system, one or more applications, other program modules and program data. Each or a certain combination of these examples may include an implementation of a network environment. The program module 807 typically performs the functions and/or methods in the embodiments described herein.

The server 80 may further communicate with one or more external devices 809, such as a keyboard, a pointing device, a display 810, or the like, and may also communicate with one or more devices that enable the user to interact with the device, and/or communicate with any device, such as a network card, a modem, or the like, that enable the server 80 to communicate with one or more other computing devices. Such communication may be implemented through an input/output (I/O) interface 811. In addition, the server 80 may also communicate with one or more networks, such as a local area network (LAN), a wide area network (WAN), and/or a public network, such as the Internet, through a network adapter 812. As shown in FIG. 11, the network adapter 812 communicates with other modules of the server 80 through the bus 803. It should be understood that, although not shown, other hardware and/or software modules may be utilized in combination with the server 80, including but not limited to: a microcode, a device driver, a redundant processing unit, an external disk drive array, a redundant-arrays-of-independent-disks (RAID) system, a tape drive, and a data backup storage system, etc.

The processing unit 801 performs various functional applications and data processing by running programs stored in the system memory 802. For example, if the server 80 is configured on the manager, the multi-party data joint query method described in Embodiment 1 or Embodiment 2 of the present disclosure is implemented; if the server 80 is configured on the provider, the multi-party data joint query method described in the embodiment 3 or 4 of the disclosure is implemented.

Embodiment 8

Embodiment 8 of the present disclosure also provides a computer-readable storage medium on which a computer program is stored. If the computer-readable storage medium is a computer-readable storage medium of a manager, when the program is executed by a processor, the multi-party data joint query method according to the embodiment 1 or 2 of the present disclosure is implemented; if the computer-readable storage medium is a computer-readable storage medium on a provider, when the program is executed by the processor, the multi-party data joint query method described in the embodiment 3 or 4 is implemented.

The computer storage medium in the embodiment of the present disclosure may adopt any combination of one or more computer-readable media. The computer-readable medium may be a computer-readable signal medium or a computer-readable storage medium. The computer readable medium can comprise, for example, but not limited to an electronic, magnetic, optical, electromagnetic, infrared, or semiconductor system, apparatus or device, or any suitable combination of the foregoing. More specific examples (a non-exhaustive list) of the computer readable medium comprise: an electronic connection with one or more wires, a portable computer diskette, a hard disk, a random access memory (RAM), a read only memory (ROM), an erasable programmable read-only memory (EPROM or a flash memory), an optical fiber and a portable compact disk read-only memory (CDROM), an optical memory device, a magnetic memory device, or any of the suitable combination of the foregoing. In this document, a computer-readable storage medium may be any tangible medium that contains or stores a program that can be used by or in combination with an instruction execution system, apparatus, or device.

The computer readable signal medium may include a data signal that is propagated in a baseband or as part of a carrier, carrying computer readable program codes. The data signal propagated in this manner may adopt a plurality of forms including, but not limited to, an electromagnetic signal, an optical signal, or any suitable combination thereof. The computer readable signal medium may also be any computer readable medium other than a computer readable storage medium. The computer readable medium may send, propagate, or transmit a program to be utilized by or in connection with an instruction execution system, apparatus, or device.

Program codes contained in the computer readable medium may be transmitted over any suitable media, including but not limited to wireless, electric wire, optical cable, RF (Radio Frequency), or any suitable combination of the foregoing.

Computer program codes for performing the operations of the present disclosure may be written in one or more programming languages, or a combination thereof, including an object-oriented programming language such as Java, Smalltalk, C++, and conventional procedural programming languages such as the C language or similar programming languages. The program codes may be entirely executed on a user's computer, partly executed on the user's computer, executed as a stand-alone software package, partly executed on the user's computer and partly on a remote computer, or entirely executed on the remote computer or terminal server. In the case of a remote computer, the remote computer can be connected to the user's computer through any kind of network, including a local area network (LAN) or wide area network (WAN), or it can be connected to an external computer (such as through Internet connection provided by an Internet service provider).

The serial numbers of the foregoing embodiments are merely for description, and do not represent the superiority or inferiority of the embodiments.

Those skilled in the art should understand that the modules or operations of the embodiments of the present disclosure described above can be implemented by a general-purpose computing device, which can be centralized on a single computing device or distributed on a network composed of multiple computing devices. Alternatively, they can be implemented with program code executable by a computer device, so that they can be stored in a storage device and executed by a computing device, or made into individual integrated circuit modules, or making multiple modules or operations into a single integrated circuit module for implementation. As such, the disclosure is not limited to any particular combination of hardware and software.

Each embodiment in this disclosure is described in a progressive manner. Each embodiment focuses on the differences from other embodiments, and the same or similar parts between the various embodiments may refer to each other.

The above description provides embodiments of the present disclosure and is not intended to limit the present disclosure. For those skilled in the art, the present disclosure may have various modifications and changes. Any modification, equivalent replacement, and improvement made within the spirit and principle of the present disclosure shall be included in the protection scope of the present disclosure.

What is claimed is:

1. A multi-party data joint query method, wherein, the method is executed by a manager, the method comprising:
  analyzing a multi-party joint query sentence to obtain a logical execution plan;
  processing the logical execution plan according to providers of respective nodes in the logical execution plan to obtain a physical execution plan of each provider; and
  generating a query instruction of each provider according to the physical execution plan of each provider, and sending the query instruction to respective provider, wherein the query instruction is configured to instruct the providers to perform a query cooperatively, the query instruction of each provider comprising a plurality of sub-execution commands, each of the plurality of sub-execution commands has a corresponding execution order, the plurality of sub-execution commands are executed in turn by the corresponding provider according to the execution order corresponding to each sub-execution command; the query instruction of each provider comprising a mark type of each operator in the physical execution plan of the provider, the mark type comprises a unilateral computing operator, a multi-party non-mixed operator, or a multi-party mixed column operator, the mark type is determined based on a number of providers involved by the operator.

2. The method according to claim 1, wherein processing the logical execution plan according to providers of respective nodes in the logical execution plan to obtain the physical execution plan of each provider, comprises:
generating the physical execution plan of each provider according to the logical execution plan; and
determining the mark type of each operator in the physical execution plan of each provider.

3. The method according to claim 2, before generating the physical execution plan of each provider according to the logical execution plan, the method further comprising;
in response to determining that a node in the logical execution plan belongs to a unique provider, combining the node and sub-nodes of the node as a unilateral computing node.

4. A multi-party data joint query method, wherein, the method is executed by a local provider, the method comprising:
receiving a query instruction from a manager, wherein the query instruction is determined by the manager through: analyzing a multi-party joint query sentence to obtain a logical execution plan, processing the logical execution plan according to providers of respective nodes in the logical execution plan to obtain a physical execution plan of each provider, and generating a query instruction of each provider according to the physical execution plan of each provider; and
executing the received query instruction and obtaining a query result, wherein the query instruction comprising a plurality of sub-execution commands, each of the plurality of sub-execution commands has a corresponding execution order, the plurality of sub-execution commands are executed in turn according to the execution order corresponding to each sub-execution command,
wherein executing the received query instruction comprises:
executing a current operator to be executed according to a mark type and a provider of the current operator to be executed in the query instruction, the mark type comprises a unilateral computing operator, a multi-party non-mixed operator, or a multi-party mixed column operator, the mark type is determined based on a number of providers involved by the operator.

5. The method according to claim 4, wherein executing the current operator to be executed according to the mark type and the provider of the current operator to be executed in the query instruction comprises:
in response to determining that the mark type of the current operator is a unilateral computing operator and data of the current operator is derived from the local provider, executing the unilateral computing operator; and
in response to determining that the mark type of the current operator is a unilateral computing operator and the data of the current operator is derived from other providers different from the local provider, refusing to execute the unilateral computing operator.

6. The method according to claim 4, wherein executing the current operator to be executed according to the mark type and the provider of the current operator to be executed in the query instruction comprises:
in response to determining that the mark type of the current operator is a multi-party non-mixed operator and the current operator is an intersection operator, performing intersection calculation based on a privacy intersection algorithm to obtain an intersection result containing row number information of a metadata table, wherein data from other providers different from the local provider in the intersection result is represented by a placeholder.

7. The method according to claim 4, wherein executing the current operator to be executed according to the mark type and the provider of the current operator to be executed in the query instruction, comprises:
in response to determining that the mark type of the current operator is a multi-party non-mixed operator, calculating data derived from the local provider in the current operator to obtain a local calculation result; and
obtaining calculation results from other providers different from the local provider, wherein the calculation results is obtained by the other providers performing calculation on data from the other providers in the current operator, wherein the calculation results comprise row number information of a metadata table.

8. The method according to claim 7, wherein the current operator comprises at least one of an expression computing operator, a filtering operator, a sorting operator, and an aggregation operator.

9. The method according to claim 7, wherein if the current operator is an expression computing operator, data in the calculation results is represented by a placeholder.

10. The method according to claim 7, wherein if the current operator is a sorting operator or an aggregation operator, after obtaining calculation results from other providers different from the local provider, the method further comprises:
performing sorting operation or aggregating operation on the local calculation result and the calculation results from other providers.

11. A server, comprising:
one or more processors;
a storage device for storing one or more programs; and
wherein when the one or more programs are executed by the one or more processors, the one or more processors are caused to implement a multi-party data joint query method, the method comprising:
receiving a query instruction from a manager, wherein the query instruction is determined by the manager through: analyzing a multi-party joint query sentence to obtain a logical execution plan, processing the logical execution plan according to providers of respective nodes in the logical execution plan to obtain a physical execution plan of each provider, and generating a query instruction of each provider according to the physical execution plan of each provider; and executing the received query instruction and obtaining a query result, wherein the query instruction comprising a plurality of sub-execution commands, each of the plurality of sub-execution commands has a corresponding execution order, the plurality of sub-execution commands are executed in turn according to the execution order corresponding to each sub-execution command; the query instruction of each provider comprising a mark type of each operator in the physical execution plan of the provider, the mark type comprises a unilateral computing operator, a multi-party non-mixed operator, or a multi-party mixed column operator, the mark type is determined based on a number of providers involved by the operator.

12. The server according to claim 11, wherein processing the logical execution plan according to providers of respective nodes in the logical execution plan to obtain the physical execution plan of each provider, comprises:
generating the physical execution plan of each provider according to the logical execution plan; and
determining the mark type of each operator in the physical execution plan of each provider.

13. The server according to claim 11, wherein executing the received query instruction comprises:
executing a current operator to be executed according to a mark type and a provider of the current operator to be executed in the query instruction.

14. The server according to claim 13, wherein executing the current operator to be executed according to the mark type and the provider of the current operator to be executed in the query instruction comprises:
in response to determining that the mark type of the current operator is a unilateral computing operator and data of the current operator is derived from the local provider, executing the unilateral computing operator; and in response to determining that the mark type of the current operator is a unilateral computing operator and the data of the current operator is derived from other providers different from the local provider, refusing to execute the unilateral computing operator.

15. The server according to claim 13, wherein executing the current operator to be executed according to the mark type and the provider of the current operator to be executed in the query instruction comprises:
in response to determining that the mark type of the current operator is a multi-party non-mixed operator and the current operator is an intersection operator, performing intersection calculation based on a privacy intersection algorithm to obtain an intersection result containing row number information of a metadata table, wherein data from other providers different from the local provider in the intersection result is represented by a placeholder.

16. The server according to claim 13, wherein executing the current operator to be executed according to the mark type and the provider of the current operator to be executed in the query instruction, comprises:
in response to determining that the mark type of the current operator is a multi-party non-mixed operator, calculating data derived from the local provider in the current operator to obtain a local calculation result; and
obtaining calculation results from other providers different from the local provider, wherein the calculation results is obtained by the other providers performing calculation on data from the other providers in the current operator, wherein the calculation results comprise row number information of a metadata table.

17. The server according to claim 16, wherein the current operator comprises at least one of an expression computing operator, a filtering operator, a sorting operator, and an aggregation operator.

* * * * *